United States Patent
Jonckers

(10) Patent No.: US 11,161,738 B2
(45) Date of Patent: Nov. 2, 2021

(54) PROCESS FOR THE PREPARATION OF HYDROGEN

(71) Applicant: SHELL OIL COMPANY, Houston, TX (US)

(72) Inventor: Arjan Allert Jonckers, Amsterdam (NL)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 16/331,320

(22) PCT Filed: Sep. 7, 2017

(86) PCT No.: PCT/EP2017/072449
§ 371 (c)(1),
(2) Date: Mar. 7, 2019

(87) PCT Pub. No.: WO2018/046590
PCT Pub. Date: Mar. 15, 2018

(65) Prior Publication Data
US 2019/0352178 A1   Nov. 21, 2019

(30) Foreign Application Priority Data

Sep. 9, 2016 (EP) .................................... 16188009

(51) Int. Cl.
*C01B 3/40* (2006.01)
*C01B 3/48* (2006.01)
*C01B 3/56* (2006.01)

(52) U.S. Cl.
CPC ................ *C01B 3/40* (2013.01); *C01B 3/48* (2013.01); *C01B 3/56* (2013.01); *C01B 2203/0233* (2013.01); *C01B 2203/0283* (2013.01); *C01B 2203/042* (2013.01); *C01B 2203/062* (2013.01); *C01B 2203/1058* (2013.01); *C01B 2203/127* (2013.01); *C01B 2203/1241* (2013.01)

(58) Field of Classification Search
CPC .................................... C01B 3/40; C01B 3/48
See application file for complete search history.

(56) References Cited

U.S. PATENT DOCUMENTS

| 4,200,682 | A |   | 4/1980 | Sederquist |
| 4,350,614 | A | * | 9/1982 | Schwartz ............... B01J 29/061 208/120.05 |
| 6,096,106 | A | * | 8/2000 | Ruhl ........................ B01J 8/008 422/198 |
| 8,603,430 | B2 |   | 12/2013 | Norbeck et al. |
| 2006/0188435 | A1 | * | 8/2006 | Herb .......................... C01B 3/38 423/652 |
| 2007/0003478 | A1 | * | 1/2007 | Becker ................... B01J 8/0438 423/652 |
| 2009/0186952 | A1 | * | 7/2009 | Steynberg ............... C10K 1/005 518/704 |
| 2014/0103259 | A1 | * | 4/2014 | Compagne ............... B01J 8/065 252/373 |
| 2015/0215967 | A1 | * | 7/2015 | Han .................. H04W 74/0833 370/329 |
| 2017/0057888 | A1 | * | 3/2017 | Chen ..................... B01J 35/023 |

FOREIGN PATENT DOCUMENTS

| EP | 0450872 A1 | 10/1991 |
| GB | 2050413 A | 1/1981 |
| WO | 03016250 A1 | 2/2003 |
| WO | 2005019100 A1 | 3/2005 |
| WO | 2009113006 A2 | 9/2009 |

OTHER PUBLICATIONS

International Search Report and Written Opinion received for PCT Patent Application No. PCT/EP2017/072449, dated Nov. 29, 2017, 11 pages.

* cited by examiner

*Primary Examiner* — Paul A Wartalowicz
(74) *Attorney, Agent, or Firm* — Shell Oil Company

(57) ABSTRACT

Process for the preparation of hydrogen by reacting a feed gas comprising methane and carbon monoxide with steam in the presence of a steam reforming catalyst at a pressure of at least 15 bara in the heated zone of a steam reformer to obtain a raw hydrogen containing product stream, wherein (a) the feed gas is mixed with the steam before entering the steam reformer resulting in a reaction mixture of the feed gas and steam having a temperature below 540° C.; and (b) the reaction mixture obtained in step (a) is fed into the heated zone of the steam reformer where it is first contacted with an inert material before it is contacted with the steam reforming catalyst.

8 Claims, No Drawings

PROCESS FOR THE PREPARATION OF HYDROGEN

CROSS REFERENCE TO EARLIER APPLICATION

The present application is a National Stage (§ 371) application of PCT/EP2017/072449, filed Sep. 7, 2017, which claims priority benefits of European Application No. 16188009.1, filed Sep. 9, 2016, the disclosure of which is incorporated by reference herein.

FIELD OF THE INVENTION

The present invention relates to a process for the preparation of hydrogen by steam reforming a feed gas comprising methane and carbon monoxide.

BACKGROUND OF THE INVENTION

Processes for the preparation of hydrogen ($H_2$) by steam reforming are well known in the art. Typically a methane ($CH_4$) comprising feed gas is reacted with steam in the presence of a suitable steam reforming catalyst at an operating pressure of at least 15 bara. The steam reforming reaction is:

$$CH_4 + H_2O \rightarrow CO + 3H_2$$

In a subsequent stage the carbon monoxide (CO) formed is typically converted with steam via the water gas shift reaction into carbon dioxide ($CO_2$) and hydrogen:

$$CO + H_2O \rightarrow CO_2 + H_2$$

thereby increasing overall hydrogen yield.

Feed gases to a steam methane reformer-based unit for producing hydrogen, ammonia or methanol, generally contain hydrocarbons that can be converted by reaction with steam. Such feed gases could include ethane rich gas, LPG and/or naphtha. However, generally the feed gas contains at least a substantial proportion of methane in the form of (desulphurised) natural gas. In addition, such natural gas-containing feed gas often contains off gases from refinery processes and/or a Fischer-Tropsch process to reduce the feedstock costs and to effectively process these off gases. Such off gases typically contain significant amounts of carbon monoxide, which can form carbon (coke) when in contact with active metals (e.g. nickel) on steam reforming catalysts at temperatures below 540° C. and in particular at temperatures below 500° C. Predominant carbon forming reactions in such case are the Boudouard reaction:

$$2CO \rightarrow C + CO_2$$

and the CO reduction reaction:

$$CO + H_2 \rightarrow C + H_2O$$

The carbon thus formed will deposit onto the steam reforming catalyst resulting in a significant increase in pressure drop over the catalyst bed and in some cases also a decrease in the catalyst activity, which will eventually lead to a lower overall hydrogen production from the steam reforming unit.

It is, therefore, important to ensure that the reaction mixture of the methane/carbon monoxide-comprising feed gas and steam is heated to a temperature above 500° C. before it gets into contact with the steam reforming catalyst. Since steam reforming catalysts typically become sufficiently active at temperatures around 540° C., the reaction mixture is suitably preheated to a temperature of at least 540° C. before it reaches the steam reforming catalyst, so that no coke formation and deposition onto the steam reforming catalyst takes place and the catalyst can effectively promote the steam reforming reaction.

One way of preventing coke formation is by adding additional steam. However, adding additional steam goes at the expense of the amount of feed gas in case the unit is hydraulically limited and hence at the expense of the amount of hydrogen eventually produced. Furthermore, generating extra steam also costs more energy and hence is also economically unattractive.

Preheating the reaction mixture to a temperature above 540° C. by external heating means before it enters the steam reformer is another way of preventing undesired coke formation. For existing units increasing the preheat to such high temperatures by indirect heat exchange against other process streams is usually not possible or difficult to achieve, as it requires a substantial revamp of the unit (e.g. convection section coils, reformer inlet system) and (additional) expensive heat exchangers.

The present invention aims to provide a process for preparing hydrogen by steam reforming of a feed gas comprising methane and carbon monoxide where coke formation and deposition onto the steam reforming catalyst is prevented, while at the same time optimizing hydrogen production and equipment use.

SUMMARY OF THE INVENTION

The present invention relates to a process for the preparation of hydrogen by steam reforming of a feed gas comprising methane and carbon monoxide in the presence of a steam reforming catalyst at a pressure of at least 15 bara, wherein the reaction mixture of the feed gas and steam is first contacted in the heated zone of the steam reformer with an inert material before it is contacted with the steam reforming catalyst.

By first contacting the reaction mixture of the feed gas and steam with an inert material, the reaction mixture having a temperature below 500° C. is quickly heated to a temperature of at least 540° C. whilst no coke is formed and deposited onto active steam reforming catalyst. Most steam reforming catalysts become sufficiently active at 540° C., so by the time the reaction mixture reaches the steam reforming catalyst, it has a temperature at which the steam reforming catalyst is active and hence the endothermic steam reforming reactions in which methane reacts with steam to form hydrogen can effectively occur.

Contacting a methane comprising feed with an inert material before contacting it with a steam reforming catalyst in the steam reforming of methane is known from e.g. GB2050413A, EP0450872A, U.S. Pat. No. 4,200,682 and WO2005019100A. However, none of these references discloses the use of the inert material in the heated zone of a steam reformer to prevent carbon formation in a steam reforming process where the feed gas comprises methane and carbon monoxide.

DETAILED DESCRIPTION OF THE INVENTION

Accordingly, the present invention relates to a process for the preparation of hydrogen by reacting a feed gas comprising methane and carbon monoxide with steam in the presence of a steam reforming catalyst at a pressure of at least 15 bara in the heated zone of a steam reformer to obtain a raw hydrogen containing product stream, wherein (a) the feed gas is mixed with the steam before entering the steam reformer resulting in a reaction mixture of the feed gas and steam having a temperature below 540° C.; and
(b) the reaction mixture obtained in step (a) is fed into the heated zone of the steam reformer where it is first contacted with an inert material before it is contacted with the steam reforming catalyst.

Steam reforming is a well known process for producing hydrogen. As explained above, a methane comprising feed is reacted with steam in the presence of a suitable steam reforming catalyst. Operating pressure typically is at least 15 bara. The methane reacts with steam according to the steam methane reforming reaction described above to produce hydrogen and CO. After cooling of the raw hydrogen product stream, the CO is typically converted in a subsequent stage via the water gas shift reaction into $CO_2$ and further hydrogen, thereby optimizing the hydrogen yield. After a purification treatment substantially pure hydrogen is obtained and such pure hydrogen can be used in a variety of processes. Steam reforming of a methane comprising feed can also be used to produce syngas with a relatively high hydrogen to CO ratio. Such syngas can, for example, be used to adjust the hydrogen to CO ratio of syngas used as feed to in a Fischer-Tropsch synthesis process.

The gas used as feed in the process of the present invention comprises methane and carbon monoxide. The methane may originate from natural gas, associated gas, off gases from refinery processes and/or a Fischer-Tropsch process, a mixture of $C_{1-4}$ hydrocarbons or any combination of two or more of these gases. The feed will typically comprise at least 20% v/v methane, preferably at least 35% v/v, and may even comprise more than 90% v/v of methane.

In addition to methane the feed gas comprises carbon monoxide (CO). Such CO may originate from off gases from refinery processes and/or a Fischer-Tropsch process. Such off gases are added to reduce the feedstock costs and to effectively process these off gases. In addition to CO, these off gases will typically comprise methane, $CO_2$ and $H_2$ as well as lower levels of N2, $C_{2+}$ alkanes, olefins and oxygenates. The aforesaid off gases may constitute the entire feed gas, i.e. up to 100% v/v, but preferably constitute up to 90% v/v and more preferably up to 80% v/v of the feed, with the balance up to 100% v/v preferably being desulphurised natural gas. In a preferred embodiment of the present invention the off gas used in the feed is the off gas of a Fischer-Tropsch synthesis process. A very suitable feed gas, accordingly, would be a feed gas comprising up to 100% v/v, more preferably up to 90% v/v and most preferably up to 80% v/v, of the off gas from a Fischer-Tropsch synthesis process with the balance up to 100% v/v being desulphurised natural gas.

The feed gas typically comprises at least 5% v/v of CO, suitably from 8 to 40% v/v of CO and more suitably from 10 to 35% v/v of CO. Methane content of the feed gas is at least 20% v/v, suitably between 25 and 70% v/v and more suitably between 30 and 60% v/v. The balance up to 100% v/v is typically constituted by components such as $CO_2$, $H_2$, N2, $C_{2+}$ alkanes, olefins and oxygenates.

The feed gas should be substantially sulphur-free in order not to poison the steam reforming catalyst. Steam reforming catalysts are generally highly sensitive to sulphur. So if natural gas is used as part of the feed and such natural gas comprises sulphur compounds, then any sulphur present in the natural gas should first be removed to levels of below 100 ppbv, suitably below 10 ppbv, before it is used as part of the feed for the steam reforming treatment. Accordingly, any natural gas used as part of the feed gas preferably is desulphurised natural gas.

Desulphurisation treatments are well known in the art. For example, at high sulphur levels the removal of sulphur could be performed by contacting the natural gas with a liquid mixture of a physical and chemical absorbent, typically in two steps: a first step to selectively remove $H_2S$ and a second step to remove remaining acid gases. The sulfolane extraction process is an example of such process. In addition to such desulphurisation treatment or at low sulphur levels in the natural gas, small amounts of sulphur may be removed by passing the natural gas through one or more beds of a suitable absorbent, for example zinc oxide, to absorb any $H_2S$ present. Often such absorption treatment is preceded by a hydrogenation treatment, wherein the natural gas is passed through a hydrogenation reactor to convert organic sulphur compounds into $H_2S$.

The steam reforming process of the present invention is suitably used in the hydrogen manufacturing unit in a gas-to-liquids process, in which natural gas is converted into synthesis gas and the synthesis gas is subsequently converted into liquid hydrocarbons by Fischer-Tropsch synthesis. Hydrogen is used in the Fischer-Tropsch reaction unit to ensure the synthesis gas has the correct $H_2$/CO ratio to obtain the desired hydrocarbon products in the Fischer-Tropsch synthesis and may also be used in the process unit where the liquid hydrocarbons formed in the Fischer-Tropsch unit are hydrocracked to obtain the finished products desired.

The steam reformer used in the process of the present invention could in principle be any steam reformer available on the market. Such steam reformer typically comprises a heated zone comprising one or more vertically oriented tubes containing the steam reforming catalyst and one or more burners to provide the heat. The gaseous reaction mixture of methane comprising gas and steam is passed through the catalyst-filled tubes, where the endothermic reforming reaction takes place. Reaction product is collected at the outlet of the tubes for further processing. Generally, the reaction mixture enters the catalyst-filled tubes at the top of the steam reformer, passes downwardly through the catalyst beds and the reaction product is collected at the outlet located at the bottom part of the steam reformer. However, some steam reformers are designed such that feed gas enters the catalyst-filled tubes at the bottom and is passed upwardly, so that the reaction product is collect at the outlet in the top part of the steam reformer.

The heated zone of the steam reformer (also referred to as furnace or radiant zone) could be bottom-fired, top-fired or side-fired, indicating that the burners are located respectively at the bottom, top or side walls of the heated zone. The burners provide the heat that heats the catalyst-filled tubes by radiative and convective heat transfer. All these types of steam reformers are well known in the art and may be applied in the present process.

As indicated, the tubes are heated by one or more burners arranged in the heated zone to provide the necessary heat for the endothermic steam reforming reactions.

Raw hydrogen product—also containing CO and $CO_2$—is collected at the outlet of the catalyst-filled tubes for cooling and heat recovery, for further treatment and for purification to obtain substantially pure hydrogen. Further treatment of the raw product usually involves converting the CO formed in the presence of steam into hydrogen and $CO_2$ via the water gas shift reaction.

In step (a) of the process of present invention the methane/carbon monoxide comprising feed gas and steam are first mixed to obtain a reaction mixture of such feed gas and steam having a temperature of below 540° C., suitably below 500° C. The steam to dry gas ratio molar ratio in this reaction mixture is suitably from 1 up to 10 and more preferably from 1.5 to 3.5. The expression "dry gas" as referred herein means all feed gas except steam. The dry gas will essentially consist of the feed gas minus any water or steam contained therein. This reaction mixture is subsequently passed into the heated zone where in step (b) of the present process it is first contacted with an inert material before it gets into contact with the steam reforming catalyst. In this way the reaction mixture is heated to a temperature of at least 540° C., preferably at least 550° C., whilst being in contact with the inert material, so that no coke formation takes place that can foul the steam reforming catalyst. By the time the reaction mixture reaches the steam reforming catalyst, it has a temperature at which the steam reforming catalyst is active and hence the steam reforming reactions can effectively occur. Typical steam reforming process conditions are well known in the art and typically involve temperatures from 430° C. up to 1100° C., more suitably from 540 to 950° C., and pressures from 15 to 80 bara, more suitably 20 to 50 bara.

Steam reforming catalysts that can be used in the present process can be those steam reforming catalysts known by the person skilled in the field of steam reforming. Suitable catalysts generally comprise an active metal applied on an inert refractory oxide support material. Suitable active metals include nickel or any one of the noble metals ruthenium, rhodium, palladium, iridium or platinum. Of these, nickel is the most widely used and, for the purpose of the present invention, preferred active metal. The inert refractory oxide support materials are alumina, magnesia, silica, zirconia and titania. Alumina is preferred for the purpose of the present invention.

The inert material used in step (b) of the present process suitably is a refractory oxide material which is capable of withstanding the steam reforming operating conditions and through which the steam/feed gas reaction mixture can flow. This refractory oxide material can be any of the catalyst support materials mentioned above, that is, it suitably is a catalyst support material suitable for use as support material for a steam reforming catalyst. A preferred inert material is (calcined) alumina, more preferably the same alumina support material used for the actual steam reforming catalyst.

In a preferred embodiment of the present invention the inert material is loaded on top of the steam reforming catalyst in the catalyst tubes extending vertically into the heated zone of the steam reformer. Accordingly, in this embodiment the heated zone comprises one or more vertically oriented tubes filled with inert material on top of steam reforming catalyst and the reaction mixture of the methane comprising gas and steam is passed in downward direction through the tubes. The volume ratio of inert material to steam reforming catalyst in the heated zone (i.e. in each catalyst tube) suitably is in the range of from 0.05 to 0.30, more suitably from 0.07 to 0.20.

The reaction mixture of steam and methane/carbon monoxide comprising feed gas should anyhow have a temperature below 540° C. before it enters the heated zone and is contacted with the inert material. The process of the present invention was, however, found to operate particularly effective when this reaction mixture has a temperature in the range of from 430 to 540° C., more suitably from 450 to 500° C., when it is contacted with the inert material in the heated zone.

After the methane in the feed gas and the steam have reacted in the heated zone of the steam reformer the raw hydrogen containing product stream is recovered at the outlet of the steam reformer. This raw product stream will have a high temperature and will still contain significant amount of CO formed in the reforming reaction. Accordingly, the raw hydrogen containing product stream suitably is successively cooled, subjected to a water gas shift treatment and purified by a pressure swing adsorption treatment to obtain a hydrogen stream having a purity of at least 95 mole %, more suitably of at least 99 mole %.

Cooling can take place by well known methods and is suitably carried by indirect heat exchange against another, colder process stream to (pre)heat such stream or against water in a boiler to produce steam which can subsequently be used elsewhere in the process.

A water gas shift treatment can also be carried out by ways known in the art. In such treatment CO is reacted with steam to produce additional hydrogen and $CO_2$. A combination of successively a high temperature water gas shift treatment and a low temperature water gas shift treatment could also be used.

Finally the unpurified hydrogen product stream resulting from the water gas shift treatment can be purified to yield a hydrogen product stream having comprising at least 95 mole %, more suitably at least 99 mole %, hydrogen. This hydrogen can be used elsewhere, suitably in the hydrogen manufacturing unit of a gas-to-liquids process as described in more detail above.

The invention claimed is:

1. A process for the preparation of hydrogen by reacting a feed gas comprising methane and carbon monoxide with steam in the presence of a steam reforming catalyst at a pressure of at least 15 bara in the heated zone of a steam reformer to obtain a raw hydrogen containing product stream, wherein (a) the feed gas is mixed with the steam before entering the steam reformer resulting in a reaction mixture of the feed gas and steam having a temperature below 540° C.; and (b) the reaction mixture obtained in step (a) is fed into the heated zone of the steam reformer where it is first contacted with an inert material before it is contacted with the steam reforming catalyst, wherein no coke is deposited onto the steam reforming catalyst.

2. The process according to claim 1, wherein the inert material is a catalyst support material suitable for use as support material for a steam reforming catalyst.

3. The process according to claim 1, wherein the volume ratio of inert material to steam reforming catalyst in the heated zone is in the range of from 0.05 to 0.30.

4. The process according to claim 1, wherein the temperature of the reaction mixture of the feed gas and steam when it is contacted with the inert material in the heated zone is in the range of from 430 to 540° C.

5. The process according to claim 1, wherein the heated zone comprises one or more vertically oriented tubes filled with inert material on top of steam reforming catalyst and the reaction mixture of the feed gas and steam is passed in downward direction through the tubes.

6. The process according to claim 1, wherein the feed gas comprises at least 5% v/v carbon monoxide and at least 20% v/v methane.

7. The process according to claim 6, wherein the feed gas comprises up to 100% v/v of the off-gas from a Fischer- Tropsch synthesis process with the balance up to 100% v/v being desulphurised natural gas.

8. The process according to claim 1, wherein the raw hydrogen containing product stream is successively cooled, subjected to a water gas shift treatment and purified by a pressure swing adsorption treatment to obtain a hydrogen stream having a purity of at least 95 mole %.

* * * * *